May 16, 1939.  C. A. MOORE  2,158,245
COMBINED VENTILATOR, HEATER, AND WINDSHIELD DEFROSTER FOR AUTOMOBILE BODIES
Filed July 7, 1937  2 Sheets-Sheet 1

Inventor
C. A. Moore
By L. B. James
Attorney

May 16, 1939.  C. A. MOORE  2,158,245
COMBINED VENTILATOR, HEATER, AND WINDSHIELD DEFROSTER FOR AUTOMOBILE BODIES
Filed July 7, 1937  2 Sheets-Sheet 2
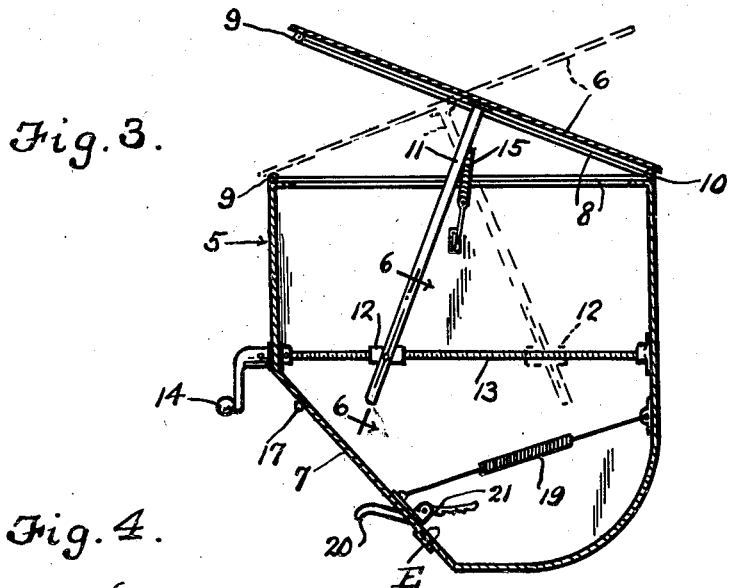
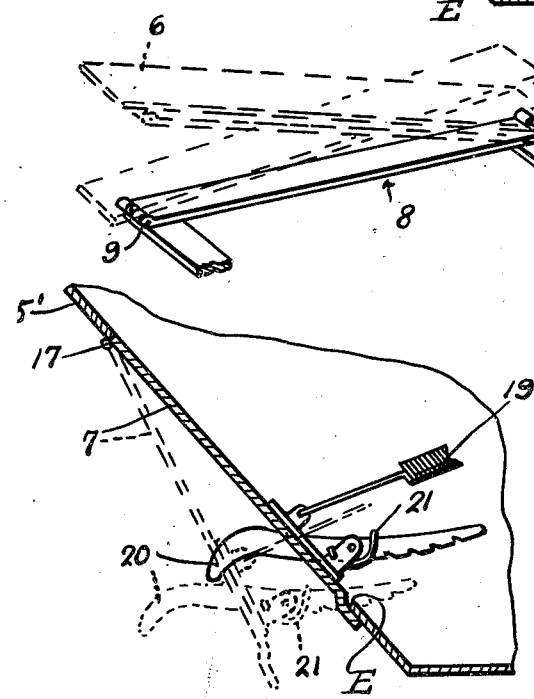
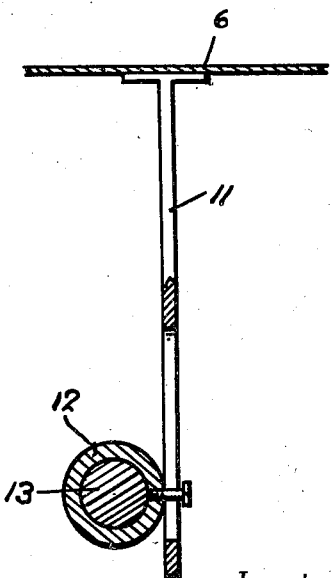
Inventor
C. A. Moore
By L. B. James
Attorney Patented May 16, 1939

2,158,245

UNITED STATES PATENT OFFICE 2,158,245

COMBINED VENTILATOR, HEATER, AND WINDSHIELD DEFROSTER FOR AUTOMOBILE BODIES

Claude A. Moore, Cheyenne, Wyo.

Application July 7, 1937, Serial No. 152,436

2 Claims. (Cl. 98—2)

This invention relates to automobile bodies and more particularly to a combined ventilator, heater and windshield defroster.

The primary object of this invention resides in the provision of means adapted to enhance the comfort and safety of the occupants of automobiles.

Another object of this invention resides in the provision of means adapted to not only heat or ventilate an automobile body but to defrost the windshield thereof.

A further object of this invention resides in the provision of a valve disposed in the body of an automobile whereby fresh air may be admitted within the body or heat from the motor conveyed therethrough to either the interior of the body or the windshield thereof.

A still further object of this invention resides in the provision of a valve for the bodies of automobiles of such construction that the shutters thereof can be readily regulated to control the air discharged therefrom.

Aside from the foregoing objects this invention resides in the provision of a particularly constructed valve for automobile bodies.

Among the many objects of this invention is the provision of a valve for automobile bodies having shutters adapted to be controlled by novel operating means.

With these and other objects in view this invention resides in certain novel features of construction and arrangement of elements to be hereinafter more particularly set forth in the specification, illustrated in the accompanying drawings and pointed out in the appended claims and, while this disclosure depicts my present conception of the invention, the right is reserved to resort to such changes in construction and arrangement of elements as come within the scope of the claims.

In the accompanying drawings forming a part of this application:

Fig. 3 is a sectional view approximately on line 3—3 of Fig. 2.

Fig. 4 is a detail perspective view of one of the two-way hinges showing a portion of the shutter secured thereto disposed in opposite open positions by dotted lines.

Fig. 5 is an enlarged sectional view approximately on line 5—5 of Fig. 2 showing the exit shutter of the valve as being closed by full lines and open by dotted lines.

Fig. 6 is a detail sectional view approximately on line 6—6 of Fig. 3 of the ventilating shutter and controlling means.

Figure 1:
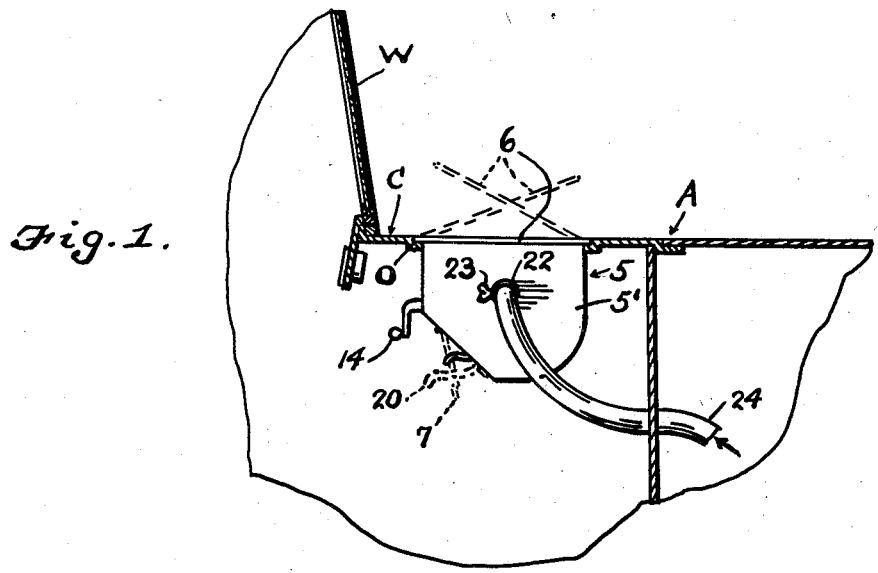
Fig. 1 is a detail longitudinal sectional view through a portion of an automobile body showing the elements of this invention disposed in operative position therein.
Figure 2:
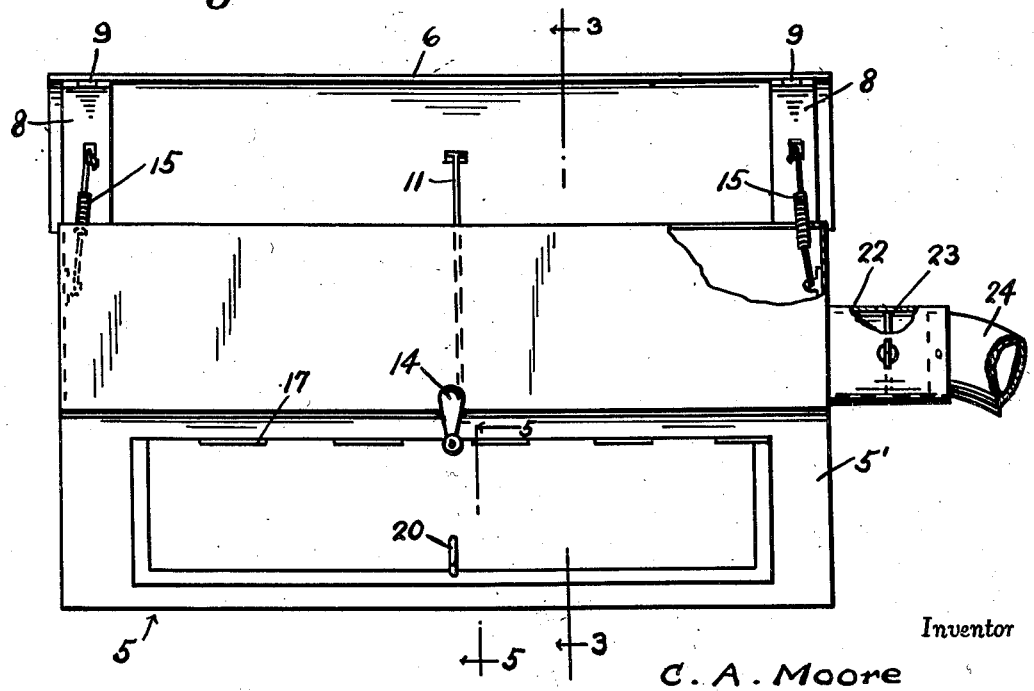
Fig. 2 is an enlarged rear view of the valve.

In the present illustration of this invention the letter A designates a portion of an automobile body which, among other elements, is provided with a cowl C and windshield W.

Suitably secured beneath the cowl C in communication with an opening O formed therein, is an elongated valve 5 consisting of a casing 5' provided with a ventilating shutter 6 adapted to form a closure for the aforesaid opening O in the cowl and an exit shutter 7 adapted to form a closure between the interior of the body and source of heat or fresh air.

The aforesaid ventilating shutter 6 is secured to the valve by two-way hinges 8 having their pivotal points disposed at 9 and 10 the former of which permit the shutter to be opened so as to admit fresh air into the valve while the latter of which permit the shutter to be opened in the opposite direction to discharge warm air from the valve against the windshield.

Although operation of the aforesaid ventilating shutter may be obtained through the instrumentality of numerous well known means it is, in the present instant, controlled through the medium of an arm 11 rigidly secured thereto and slidably connected to a block 12 threadedly disposed on a threaded shaft 13 mounted in the valve casing and having a crank handle 14 secured to its outer end. Through the provision of this association of elements the shutter 6 will open toward the windshield upon turning the crank handle in one direction and toward the front of the automobile for scooping up fresh air upon turning the crank handle in the opposite direction and, in order to exert tension on the shutter so it will readily respond to the movement of the block 12, springs 15 are connected thereto and anchored to the walls of the valve casing.

The exit shutter 7 is hinged as at 17 to the valve casing and is normally held in closed position by a spring 19 connected at one end thereto and secured at its opposite end to the valve casing and, in order to retain the shutter 7 in adjusted open position, a serrated lever 20 is pivoted to the shutter under the influence of a spring 21 for engagement with the wall E of the valve casing.

Preferably extending from one side of the valve casing and communicating with the same is a collar 22 having a butterfly valve 23 therein, said collar is adapted to be connected by a suitable conduit 24 to a conventional hot-air heater (not shown) carried or connected to the automobile motor.

Should the occupants of an automobile, equipped with this invention, desire warm air the ventilating shutter will be closed and the butterfly-valve and exit shutter will be opened whereupon heat will pass through the valve 5 into the automobile and, in the event fresh air is desired, the butterfly-valve will be closed, the ventilating shutter will be opened on its pivot 9 by the crank handle and cooperating elements and the exit shutter held opened to the desired adjusted position by the lever 20.

During winter seasons when frost or ice forms on the exterior of the windshield the ventilating shutter will be opened toward the windshield and, with the exit shutter closed, the butterfly-valve will be opened to permit hot air to pass through the valve casing and be discharged against the windshield, preferably but not necessarily, directly in front of the operator.

Having thus fully described my invention what I claim and desire to protect by Letters Patent is:

1. A valve for the body of automobiles, comprising a casing, a two-way ventilating shutter hinged to the casing, springs connecting the shutter to the casing, a slotted arm rigidly secured to the ventilating shutter and extending within the valve casing, a shaft threaded throughout its major portion rotatably mounted in the valve casing, a crank handle secured to the outer end of the shaft, a block threadedly disposed on the shaft and slidably connected to the arm of the ventilating shutter, said block being moved to one side of the center of the shaft to open the shutter in one direction and to the opposite side of the center of the shaft to open the shutter in the opposite direction, retractile springs anchored to the valve casing and connected to the ventilating shutter, an exit shutter pivotally secured to the valve casing, a retractile spring secured to the exit shutter and anchored to the valve casing, adjusting means carried by the exit shutter, a heat conduit connected to the valve casing, and a valve in the conduit.

2. A valve for the body of automobiles comprising, a casing having an opening therein, a two-way hinge secured adjacent certain sides of the casing over the opening therein, a ventilating shutter hingedly connected at its opposite ends to certain members of the two-way hinge, a slotted arm rigidly secured to the medial portion of the shutter and extending within the casing, a threaded shaft journaled in the casing with one end extending therethrough, a traveling block threadedly disposed on the shaft, means passing through the slot in the arm of the shutter and connecting the same to the traveling block, retractile springs connecting the medial points of certain members of the two-way hinges to the casing approximately midway between certain sides thereof, and a handle on the protruding end of the threaded shaft.

CLAUDE A. MOORE.